T. S. PATTERSON.
POWER TRANSMITTING APPARATUS.
APPLICATION FILED APR. 19, 1917.
1,276,701.
Patented Aug. 20, 1918.
4 SHEETS—SHEET 3.
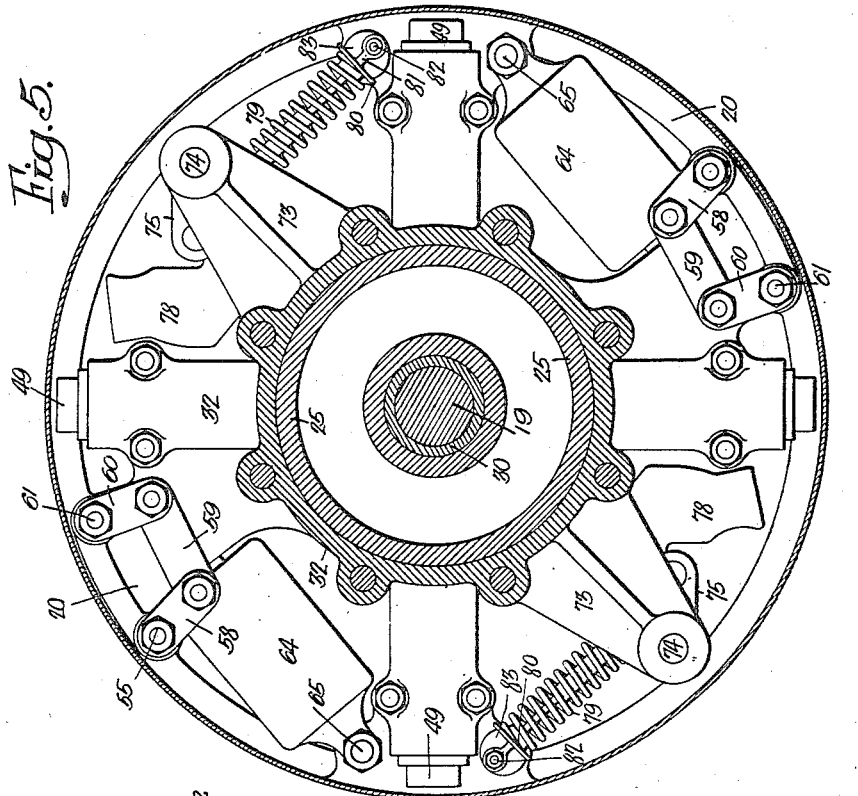
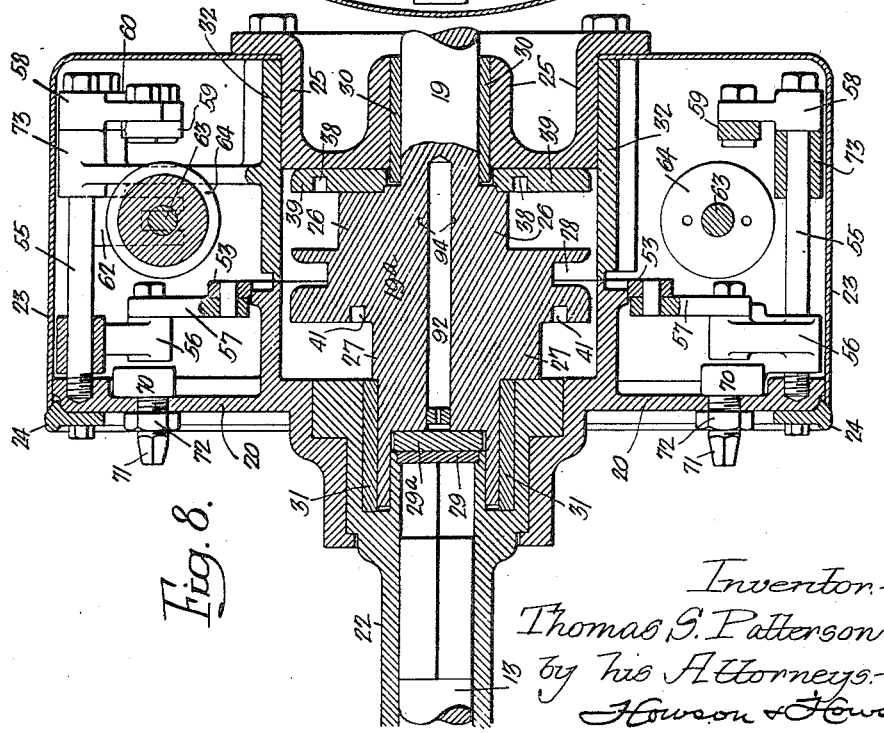
Inventor—
Thomas S. Patterson.
by his Attorneys—
Howson & Howson

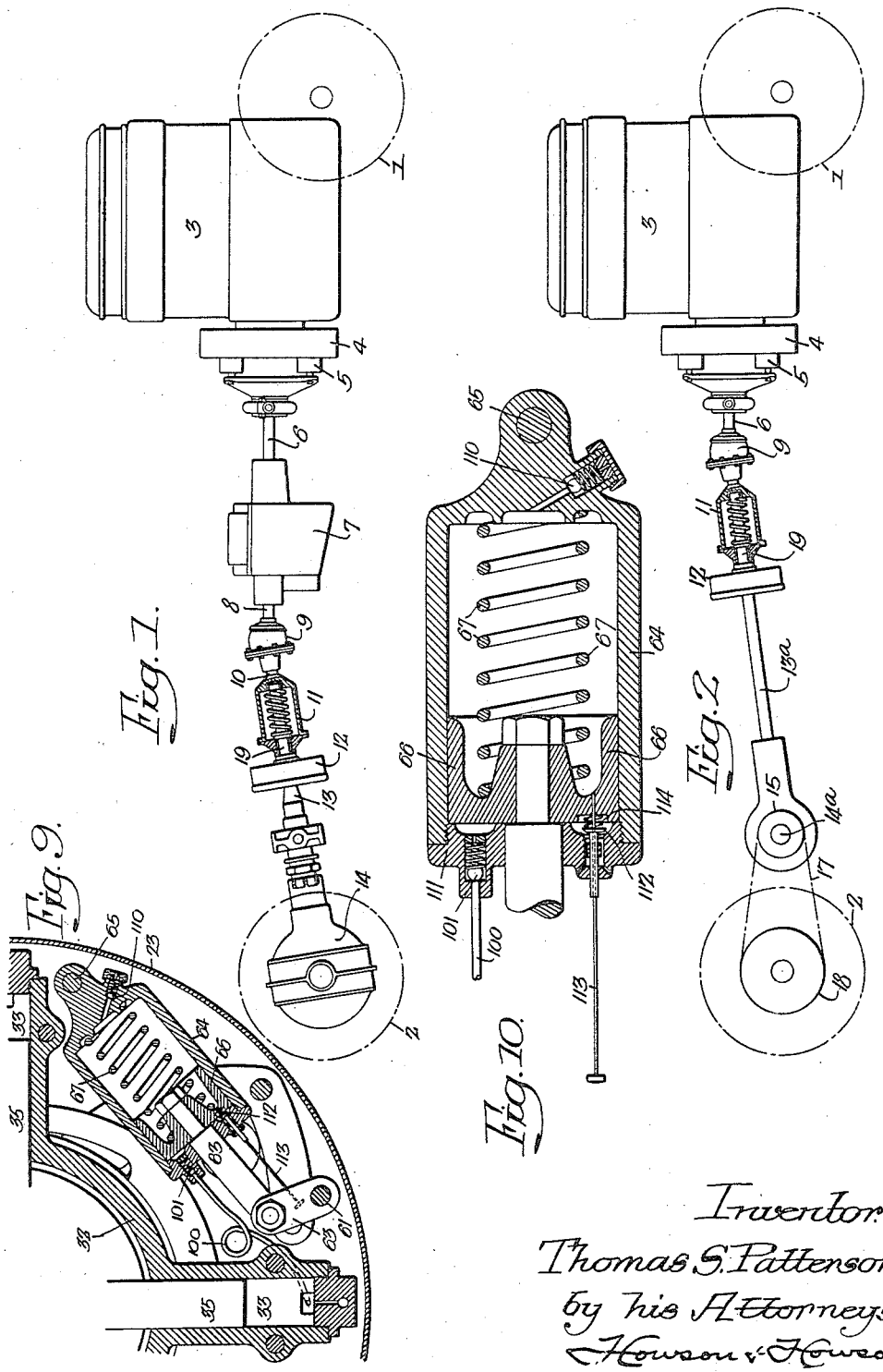

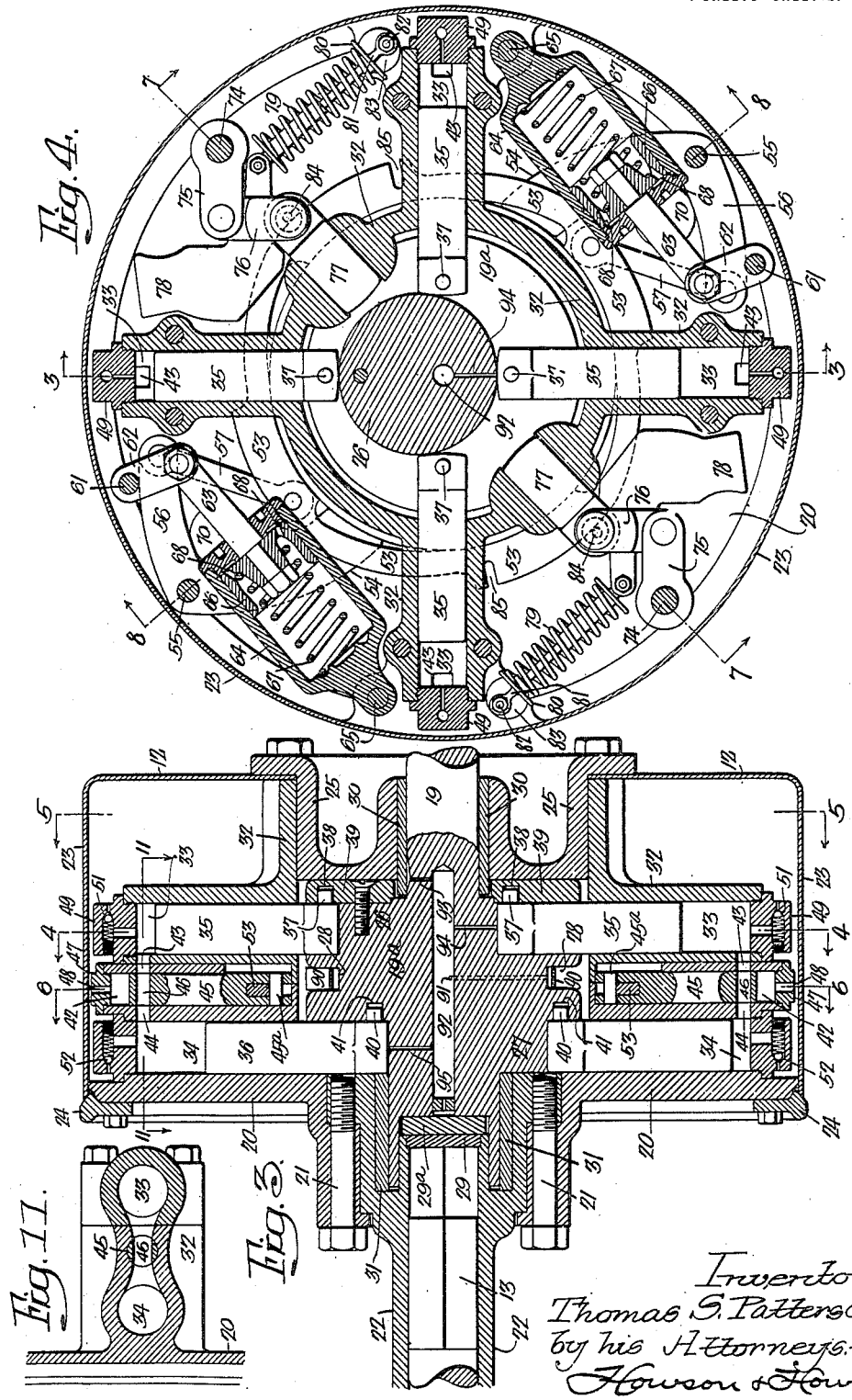

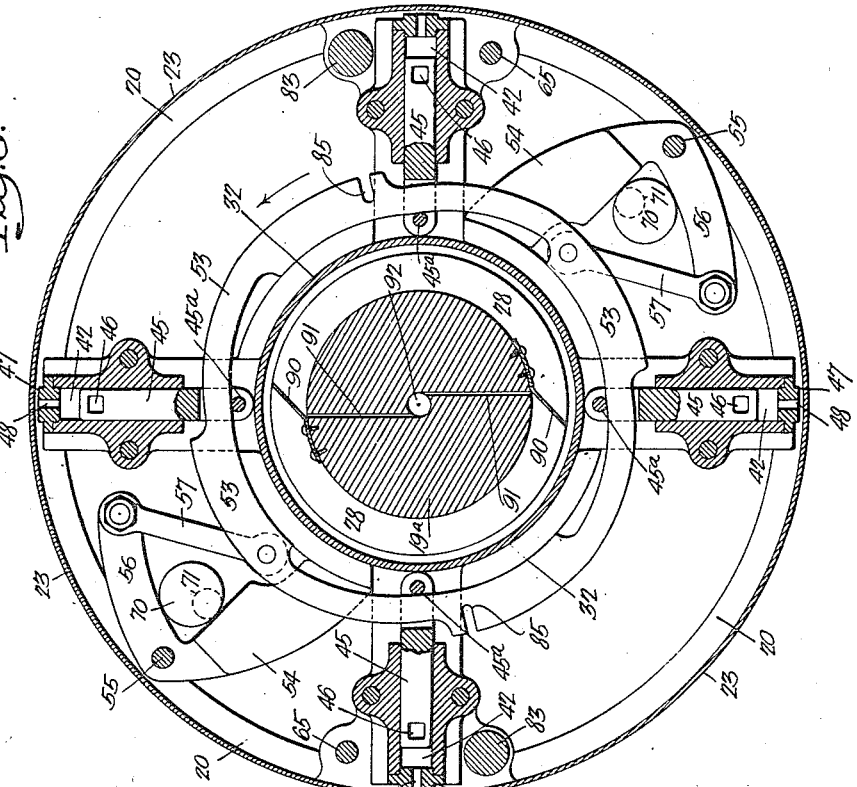

UNITED STATES PATENT OFFICE.

THOMAS S. PATTERSON, OF ROSEMONT, PENNSYLVANIA.

POWER-TRANSMITTING APPARATUS.

1,276,701.   Specification of Letters Patent.   Patented Aug. 20, 1918.

Application filed April 19, 1917. Serial No. 163,193.

*To all whom it may concern:*

Be it known that I, THOMAS S. PATTERSON, a subject of the King of Great Britain and Ireland and the Isle of Man, (having declared my intention of becoming a citizen of the United States,) residing in Rosemont, Montgomery county, State of Pennsylvania, have invented Power-Transmitting Apparatus, of which the following is a specification.

One object of this invention is to provide a device which will prevent the sudden application of power to a member or mechanism to be driven and more especially to prevent the too rapid and injurious coupling of an engine or motor to the wheels of a vehicle, either by reason of the carelessness or intent of the operator.

I further desire to provide a combination of apparatus which shall be capable of automatically regulating the transmission of power from an engine to the wheels of a motor vehicle with a view to accelerating the latter at a proper and suitable rate independently of the manipulation of the controlling apparatus by the operator, after the latter has moved the power controlling member to its "full speed" position.

I also desire to provide a device which will require the lapse of a definite predetermined time after a driven member, such as a wheel, has been started before it is positively connected to a source of power.

Another object of my invention is to provide a form of acceleration governor which will automatically control the starting up of a machine, such as a motor vehicle, so as to permit unskilled handling of the controlling mechanism without damage to the mechanism and which, in the case of such a vehicle, shall allow of the connection between the engine and the wheels being gradually and automatically accomplished at the speed best fitted for the engine to drive the vehicle at whatever gear ratio has been selected;—the arrangement being such as to prevent the driven member exceeding a predetermined speed as long as such speed would be unsuited to the predetermined gear ratio.

I also desire to provide a novel system of apparatus for connection between the prime mover of a motor vehicle and the wheels thereof which shall include two devices, one a hydraulic mechanism designed to transmit power or become operative at speeds less than five miles an hour for example, and the other capable of positively coupling the driving and driven elements when the vehicle is moving at more than such definite speed, but free to slip if abnormal or excessive torque is applied.

These objects and other advantageous ends I secure as hereinafter set forth, reference being had to the accompanying drawings, in which:

Figures 1 and 2 are side elevations, to some extent diagrammatic, illustrating my invention as applied to transmit power from an engine to the wheels of motor vehicles of the gear-driven and chain-driven types respectively;

Fig. 3 is a vertical section taken longitudinally of the driving shaft on the line 3—3, Fig. 4;

Figs. 4, 5 and 6 are transverse vertical sections on the lines 4—4, 5—5, and 6—6; respectively, Fig. 3;

Figs. 7 and 8 are longitudinal sections on the lines 7—7 and 8—8, Fig. 4;

Fig. 9 is a fragmentary elevation illustrating a modification of one feature of the invention;

Fig. 10 is an enlarged longitudinal section of certain of the parts shown in Fig. 9; and Fig. 11 is a section on the line 11—11, Fig. 3.

In Figs. 1 and 2 of the above drawings, 1 and 2 represent the front and rear wheels of a motor vehicle whose motive power is furnished by any suitable prime mover, illustrated as an internal combustion engine 3 which is shown as equipped with a flywheel 4 and a main clutch or coupling device 5 of any desired construction. In the case of the apparatus shown in Fig. 1, the driven shaft 6 of the clutch extends into a suitable casing 7 having any suitable form of change speed apparatus, usually gearing, which includes a driven shaft 8 connected through a universal joint 9 with a shaft section 10. From this latter, power is transmitted through any desired clutching device 11 designed to slip whenever the torque exceeds a predetermined maximum, thence through a device 12 constituting one of the features of my invention, to a shaft 13, through differential gearing mounted in a casing 14, to the axles and to the rear wheels of which one is illustrated at 2.

In the case of a chain drive, the casing 7 with its change speed apparatus is omitted and the power from the engine, after transmission through the universal joint 9, the slipping clutch 11 and the acceleration regulator 12, is intended to drive a rearwardly extending shaft 13$^a$ which, through suitable gearing (not shown) actuates a transverse shaft 14$^a$. This carries a pair of sprockets 15, each of which is connected through a chain indicated at 17, to a sprocket 18, operatively connected to a shaft or axle, on which is fixed the rear vehicle wheels 2.

Referring to Figs. 3 to 8, inclusive, it will be seen that the shaft section 19 which is driven by or from the slipping clutch 11, extends into the device 12 which includes a plate 20 coupled by bolts 21 to a sleeve 22 attached in any suitable manner to the driven shaft 13, which in the case illustrated, is shown as having a squared end slidably fitting said sleeve. Said plate 20 constitutes one end of a casing having a cylindrical main portion 23 to which it is rigidly connected by a ring 24 held in place by suitable bolts or screws to form a liquid-tight joint. The end of the shaft 19 extends into this casing through a flanged collar 25 bolted to or forming part of the same and is shown as having integral with it a generally cylindrical body 19$^a$ including two cylindrical portions 26 and 27 eccentric to its center line and spaced apart by a concentric portion formed with an annular groove 28.

The concentric end portion of this body extends into a similarly formed concentric recess in the sleeve 22 which has fixed in its end a plate 29, there being a bearing disk 29$^a$ inclosed between it and the adjacent face of said body. Suitable bearing shells or bushings 30 and 31 in which said shaft and body 19$^a$ rotate, are inserted between the end portion of the body and the sleeve 22, as well as between said shaft 19 and the face of the collar 25. From Figs. 4, 7 and 8, it will be noted that the plate 20 above referred to forms part of a casting including a cylindrical portion 32 projecting concentrically within the casing 23 and rotatable upon the outer surface of the flange or sleeve structure of the collar 25. This cylindrical structure has two sets of radial projections each formed with cylindrical cavities 33 and 34, extending radially outward from the center line of the shaft 19, there being four of such cavities in each set, of which those indicated at 33 are provided with radially operative plungers 35 having their inner ends engaging with the eccentric 26. Similarly the cavities 34 contain plungers 36 having their inner ends operative upon the eccentric 27.

All of the plungers have their inner ends square in transverse section and the plungers 35 have a trunnion or pin 37 projecting parallel to the shaft 19 into an annular groove 38 in a flat ring 39 mounted between the inner face of the sleeve 25 and the adjacent face of the eccentric 26. Similarly the plungers 36 each has a projecting pin or trunnion 40 extending into an annular groove 41 formed in the body structure 19$^a$ between the eccentrics 26 and 27. As a result of this arrangement of parts, both sets of plungers are at all times maintained with their ends in sliding engagement with their respective eccentrics so that while being prevented from rotation in the cylinders 33 and 34, they are compelled to reciprocate therein when the shaft 19 is turned.

As shown in Fig. 6, there is formed between each pair of the cylindrical cavities 33 and 34, a radial valve cavity 42 connected to both of said cavities through ports 43 and 44, and in each of said valve chambers is a radially movable valve 45 having a transverse port 46 which in one position of said valve, is in line with the ports 43 and 44 and therefore permits communication between the adjacent pair of cylinders 33 and 34. The inner end of each of the valves 45 is forked or slotted for the reception of a cam ring 53 and is provided with a pin 45$^a$ extending between its branches within said ring so that rotation of the latter in one direction acts directly on the valves to force them out while rotation in the opposite direction causes it to act upon the pins 45$^a$ to draw said valves inwardly.

The outer end of each of the valve chambers is preferably closed by a screw plug 47 having through it a restricted passage 48 whereby limited quantities of liquid may flow into or out of the valve chamber as the valve is moved. The outer end of each of the cylinders 33 is likewise closed by a screw plug 49 having in it a passage normally closed by an inwardly opening, spring-pressed check valve 51 while the outer ends of the cylinders 34 are likewise equipped with passages having inwardly opening check valves 52;—the arrangement of both cylinders being such that liquid will flow into the same from the casing 23 whenever the pressure in the latter exceeds that in said cylinder, although no return of such liquid is possible from said cylinders.

With the above arrangement of parts the cam ring 53 when turned through a predetermined angle, will simultaneously move all of the valves from positions in which they close off or prevent communication between the ports 43 and 44 into positions in which they permit such communication or vice versa, and for automatically actuating this cam ring, I provide a pair of oppositely disposed governor weights 54, pivoted to the casing by transverse spindles 55 (Figs. 6 and 8) and having arms 56 respectively connected to said ring by links 57.

As shown in Figs. 5 and 8, each of the shafts 55 has non-rotatably fixed to it an arm 58 which, through a link 59, is connected to a second arm 60 in turn fixed to a spindle 61 rotatably supported in a bearing provided in the cylinder structure 32. Each of the latter spindles also has fixed to it an arm 62 connected to the piston rod 63 of a dash pot 64. As shown in Fig. 4, the dash pots each consist of a cylinder pivotally connected at one end by a pin 65 to the outer portion of the cylinder structure 32 and having within it a piston 66 to which is fixed the piston rod 63. Springs 67 within said cylinders normally maintain the pistons at one end of the same and through the rods 63, links 62, spindles 61, arms 60, links 59, arms 58 and spindles 55, normally retain the governor weights 54 in their inner positions, (Figs. 4 and 6). When however said weights fly outwardly, there is a resultant rotation of the cam ring 53 with a movement of the valves 45 which is retarded by the dash pots 64, it being noted that these are normally filled with liquid which is required to pass through restricted channels 68 in the pistons 66 before the latter can move in said cylinders.

For limiting the possible inward movement of the governor weights 54 as well as for adjusting their normal positions, I provide eccentrics 70, (Figs. 6 and 8), preferably mounted on rotatable threaded pins 71 carried by the plate 20 so as to be capable of engaging said weights, but normally held from moving by a jam nut 72. The outer ends of these threaded spindles 71 are preferably squared or otherwise formed to permit of their convenient rotation by a wrench, etc.

At points preferably 90° distant from the two governor weights 54 I provide on the cylinder structure 32 a pair of projecting brackets 73, (Fig. 5) whose outer portions provide bearings for spindles 74 to which are fixed arms 75. Each of these arms has fixed to it one end of a link 76, whose opposite end is likewise pivotally connected to a plunger or slide 77, radially guided through an opening in the cylinder structure 32 so as to be capable of projection into engagement with the eccentric 26 under certain conditions. Each of said arms 75 has rigidly fixed to or formed integral with it a weight 78 normally held in toward the body of the cylinder structure by a spring 79 which offers a resistance to the outward movement of said weight. One end of each of said springs engages a plate 80 fixed to a rod 81 mounted on a pin 82 which is carried by an eccentric 83 (Fig. 4). These eccentrics may be rotated by any suitable means to vary the force exerted by their respective springs upon the weights 78.

From Fig. 4, it will be noted that the arm 75, link 76 and plunger 77 of each set is so proportioned that said arms and links constitute a toggle which, when in its straightened position, effectually prevents outward movement of its plungers or slides 77. Moreover the pin 84 whereby each of said slides or plungers 77 is connected to its link 76, is laterally extended over the adjacent cam ring 53. This latter has two suitably placed notches or recesses 85, Figs. 4 and 6, into which said pins must necessarily pass before the toggles 75—76 can move from their broken positions into their straightened positions since the edge of said cam ring normally engages said pins so as to ordinarily prevent such motion. In other words, before the weights 78 can act to straighten out their toggles and force in the slides 77, the cam ring 53 must have been rotated sufficiently to bring its recesses 85 immediately under the pins 84.

It is to be understood that under conditions of use the casing structure 23 is partially filled with oil or other suitable lubricant which in greater or less quantities is likewise present within the cylinder structure 32, and in order that there may be a proper supply of such lubricant delivered to certain parts where it is required, I preferably mount within the groove 28 of the body a pair of inclined vanes or blades 90 (Fig. 6) designed to scoop up said lubricant from the lower part of the hollow of said cylinder structure;—there being channels 91 extending through the body from the inner portions of said vanes to a longitudinally extending channel 92 in the body 19ª. One end of this channel communicates with a cavity in which is mounted the thrust plate 29ª, while the opposite end through a small channel 93 is connected to supply lubricant to the bushing 30. Other channels 94 and 95 extend from the channel 92 into the various cylinders 33 and 34.

Under conditions of operation characterizing a vehicle or other mechanism equipped with the apparatus shown in Figs. 1 or 2, the engine would be started and the clutch 5 thrown in, in the customary manner: the lever controlling the change speed gear mechanism within the casing 7, Fig. 1, having been previously set at any desired speed or gear combination. Under these conditions the shaft 19 is started from rest and turned at an increasing speed with the result that the various pairs of plungers 35 and 36 are reciprocated in their cylinders 33 and 34. Since one or more pairs of said cylinders are filled with liquid, and since the eccentrics 26 and 27 are set 180° apart, this reciprocation of the plungers causes liquid to be forced at each revolution from that one of the cylinders 34 for example which happens to be lowermost, through the intermediate valve into the adjacent cylinder 33. The various parts are so designed that as the shaft 19 reaches and passes a predetermined speed, the friction of the liquid in the valves and ports renders it increasingly difficult for the plungers 35 and 36 of the respective pairs to be reciprocated and as a consequence the cylinder structure 32 with its attached parts and the shaft 13, is carried around the same direction as the shaft 19, thereby starting the wheels 2 and moving the vehicle carried by them.

As the speed of said shaft is still further increased, the speed of the cylinder structure 32 and the shaft 13 likewise increases, until a point is reached where the centrifugal force acting on the weights 54 causes these to swing outwardly on their pivots 55, against the resistance of the mechanism to which they are connected and particularly that of the springs 67 of the dash pots. There is therefore a partial revolution of the cam ring 53 in the direction of the arrow (Fig. 6) and a consequent partial cutting off of the communication between the various pairs of ports 43 and 44 and of the cylinders 33 and 34. This throttling of the flow of liquid between the cylinders of each pair, results in the cylinder structure 32 with its attached parts and the shaft 13 being carried around at a gradually increased speed, until when the governor weights 54 have reached their extreme outer positions, the valves 45 have so far been moved outward as to completely cut off communication between the ports 43 and 44.

The various plungers 35 and 36 and hence the cylinder structure 32, and the shaft 13, are now hydraulically locked to the shaft 19, so that aside from such small amounts of slip as may be due to leakage, said shaft is turned at the same speed as the shaft 19. It is noted that this outward movement of the weights 54 and the operation of the valves 45 is prevented from occurring at an objectionably high rate of speed by reason of the action of the dash pots 64 which requires a certain amount of time to be consumed regardless of the speed of revolution of the shaft 19 and its attached parts, since the liquid in the dash pot cylinders has to pass through the restricted openings 68 in the pistons 66.

By the time that the cam ring 53 has been turned far enough to hydraulically lock together the two shafts 19 and 13, its recesses 85 have been brought radially into line with the pins 84 so that the weights 78 are allowed to swing out as said pins enter these recesses against the action of the springs 79.

The slides or plungers 77 are thus moved inwardly into engagement with the eccentric 26 and owing to the slight slippage between said eccentric and the cylinder structure 32, one of them will shortly move in sufficiently to permit of its toggle 75—76 assuming a straight position, whereupon the shaft 19 will be positively locked to the cylinder structure 32 and to the shaft 13.

Under practical conditions, the various parts are so designed that the two shafts 19 and 13 may be hydraulically locked when the vehicle attains a predetermined speed, such for example as five miles an hour, and said parts will be positively or mechanically locked together at a slightly higher speed, such as six miles an hour.

Obviously with such an arrangement of parts it is an absolute impossibility for even the most careless operator to so connect the engine or motor to the wheels as to injuriously overload it or cause injurious strains to any of the parts, since the driving and driven members cannot be positively connected until they have attained the particular speed proper for the gear ratio selected. If an abnormal load should be applied to the wheels 2 or other driven member, the clutch 11 will slip, thus permitting the engine 3 to continue operation without stalling.

If at any time the speed of the apparatus should fall to a predetermined point, (in the case illustrated to six miles an hour), the springs 79 as well as the decrease of centrifugal force acting on the weights 78, will cause the latter to move inwardly, thus automatically unlocking or releasing the positive connection between the shafts 19 and 13, and as the speed is still further decreased, the weights 54 will likewise move in under the action of the springs 67, gradually opening communication between the various pairs of cylinders 33 and 34, and permitting increasing slip between the members 19 and 13, until the shaft 13 is no longer turned.

With such an arrangement of parts, a vehicle will start without sudden jars and there can be no spinning of the rear wheels: it being obvious that it can be driven with the change speed gear set in "high" or at any other combination of gears at speeds less than five miles an hour or at and under any other relatively low predetermined speed.

It is especially to be noted that the action of the apparatus is absolutely automatic in gradually bringing the vehicle up to the predetermined speed for which the change speed gearing is set without jar or liability of injury to any of the parts. While the casing 23 is only partially filled with lubricant or other liquid, so that after standing idle for some time certain of the cylinders will be emptied, the apparatus will none the less operate since the cylinders and their associated cavities are quickly filled owing to the entrance of the liquid past the check valves 50 and 52.

In order to adapt my apparatus for use in connecting a driven member to a driving member where the speed of the latter is at all times maintained constant by a governor or other means on said driving member, I may modify the apparatus to the extent shown in Figs. 9 and 10, connecting one or more of the cylinders 34 and 35 through a flexible conduit 100 to the cylinder of the dash pot 64. In such case the piston of said dash pot would not be provided with passages as in the other case illustrated and the conduit 100 would include a check valve 101 whereby flow of fluid would be permitted only in a direction from the cylinder 34 to the dash pot 64, the latter having also a check valve 110 whereby liquid is permitted to escape from said cylinder in front of the piston 66 but is prevented from flowing into said cylinder. The head 111 of said cylinder has mounted in it an inwardly opening valve 112 having a tubular stem through which passes a headed rod 113 fastened into the piston 66. This latter has a spring 114 mounted on said rod in position to hold the valve 112 seated when said piston occupies its external position practically in engagement with the head 111.
With this arrangement of parts, if it is desired to connect a driving shaft running at 100 R. P. M., for example, with another shaft, while the weights 54 would not fly out when the apparatus was first started, the continued operation of the plungers in the cylinders 34 and 35 will shortly cause flow of small quantities of liquid through the conduit 100 to the dash pot from the cylinder connected thereto, thus gradually forcing the piston 66 away from the head 111, the valve 112 being held closed by the spring 114. As a result the various links and levers 62, 54, etc., connected to the dash pot piston rod 63, as well as the cam ring 53, are shifted as previously described, causing a gradual closing of the valves 45 and a throttling of the passages 46 between the cylinders 33 and 34 of the various pairs. The cylinder structure 32 and the driven shaft 13 connected thereto are thereupon put in motion and gradually brought up to speed until finally the various parts after being hydraulically coupled will be positively connected as previously described.

It is noted that as the dash pot piston 66 approaches the end of the cylinder 64 distant from the head 111, the head of the rod 113 engages the stem of the valve 112, opening the latter and allowing the liquid in said cylinder to escape. This however does not affect the elements connected to the piston 66 since it as well as they are maintained in their displaced positions with the valves 45 closed owing to the effect of centrifugal force on the weights 78.
I claim:—

1. The combination of a driving and a driven member; automatically acting hydraulic means for connecting said members; and mechanical means for positively connecting the members after said hydraulic means has acted to a predetermined extent.

2. The combination of a driving and a driven member; hydraulic means for automatically connecting said members; and automatic mechanical means for positively locking the members together after the hydraulic means has operated.

3. The combination of a driving and a driven member; automatically acting means for non-positively coupling said members when the speed of the driven member is below a predetermined amount; and automatically acting means for positively locking said members together when the speed of the driven member exceeds said amount.

4. The combination of a driving and a driven member; positive and non-positive devices for connecting said members; and means for insuring the elapse of a definite time after the non-positive device has acted before the positive device can act.

5. The combination of driving and driven members; automatic non-positive and positive devices for connecting said members;
and means independent of said devices for preventing the positive device from acting until after the non-positive device has acted.

6. The combination of driving and driven members; automatic non-positive and positive devices for connecting said members; and means independent of said devices for preventing the positive device from acting until after the non-positive device has caused the driven member to acquire a definite speed.

7. The combination of driving and driven members; automatic non-positive and positive devices for connecting said members; and means independent of said devices for causing the positive device to operate after the non-positive device.

8. The combination of a source of power; a driven member; a change speed gear connected to said source of power; and a device between the change speed gear and the driven member for causing power to be gradually applied to the latter.

9. The combination of a source of power; a driven member; a change speed gear connected to the source of power; and an acceleration governor connected between said change speed gear and the driven member.

10. The combination of a source of power; a driven member; a change speed gear connected to the source of power; an acceleration governor connected between said change speed gear and the driven member; and an automatic device for limiting the power transmitted to the driven member.

11. The combination of a source of power; a driven member; a change speed gear connected to the source of power; with an acceleration governor connected between said change speed gear and the driven member.

12. The combination of a driving and a driven member; automatic speed controlled means for non-positively connecting said members when the driving member is operated; and means for positively connecting the members after the driven member attains a predetermined speed.

13. The combination of a driving and a driven member; an automatic device for non-positively connecting said members when the driving member is operated; means for preventing action of said connecting means in less than a predetermined time; and a device for positively locking together said members at the end of said time.

14. The combination of a driving and a driven member; an automatic device for connecting said members when the driving member is operated; means for preventing action of said connecting means in less than a predetermined time; with speed responsive means for automatically locking said members together at the end of said time.

15. The combination of driving and driven members; a device for gradually and automatically connecting said members when the driving member is actuated; with a mechanical device for positively locking said members together when the driven member has been brought to approximately the speed of the driving member.

16. The combination of driving and driven members; cylinders and plungers respectively connected to said members; speed responsive valve mechanism for automatically controlling the flow of fluid between the cylinders; and means for automatically regulating the speed of operation of said valve mechanism.

17. The combination of driving and driven members; cylinders and plungers respectively connected to said members; speed responsive valve mechanism for automatically controlling the flow of fluid between the cylinders; and a speed responsive device for positively locking together the driving and driven members when the latter attains a definite speed.

18. The combination of a driving and a driven member; two sets of cylinders connected to one of said members; two sets of plungers connected to the other member; valve mechanism controlling the flow of fluid between the cylinders of the two sets; a centrifugal governor device for actuating the valve mechanism; and a dash pot for regulating the speed of operation of the governor.

19. The combination of driving and driven members; a fluid clutching device for transmitting power between said members; automatic valve mechanism for controlling the operation of the clutching device; and a speed responsive mechanism for positively locking together the parts of the clutching device when they are operating at substantially the same speed.

20. The combination of driving and driven members; a fluid clutching device for transmitting power between said members; automatic valve mechanism for controlling the operation of the clutching device; and a speed responsive mechanism for positively locking together the parts of the clutching device when they are operating at substantially the same speed, the same including a weighted member; a locking element actuated thereby; and toggle mechanism connecting said element and said member.

21. The combination of driving and driven members; a fluid clutching device for transmitting power between said members; automatic valve mechanism for controlling the operation of the clutching device; a speed responsive mechanism for positively locking together the parts of the clutching device when they are operating at substantially the same speed; and means for preventing operation of said locking means until the driving and driven members are operated at substantially the same speed.

22. The combination of driving and driven members; a fluid clutching device for transmitting power between said members; automatic valve mechanism for controlling the operation of the clutching device; a speed responsive mechanism for positively locking together the parts of the clutching device when they are operating at substantially the same speed; with means for preventing operation of said locking means until the driving and driven members have substantially the same speed, consisting of a structure moved by the operation of the clutching device; and a member normally prevented from movement by said structure.

23. The combination of a driving and a driven member; a structure having two sets of cylinders and connected to one of said members; plungers for said cylinders; two oppositely set eccentrics connected to the other member and operative on said plungers; valves controlling the flow of fluid between the respective cylinders of the sets; a cam structure for actuating the valves; and a speed responsive weighted element connected to said cam structure for causing it to bring the valves to predetermined positions when the speed of one of the members reaches a definite point.

24. The combination of a driving and a driven member; a structure having two sets of cylinders and connected to one of said members; plungers for said cylinders; two oppositely set eccentrics connected to the other member and operative on said plungers; valves controlling the flow of fluid between the cylinders; a cam structure for actuating the valves; a speed responsive weighted element connected to said cam structure for causing it to bring the valves to predetermined positions when the speed of one of the members reaches a definite point; and a device for delaying movement of the valve mechanism.

25. The combination of a driving and a driven member; a structure having two sets of cylinders and connected to one of said members; plungers for said cylinders; two oppositely set eccentrics connected to the other member and operative on said plungers; valves controlling the flow of fluid between the cylinders; a cam structure for actuating the valves; a speed responsive weighted element connected to said cam structure for causing it to bring the valves to predetermined positions when the speed of one of the members reaches a definite point; and a weight-controlled device for locking said two members together normally prevented by the cam structure from operating until the latter occupies a definite position.

26. The combination of driving and driven members; hydraulic clutching means for connecting said members; controlling mechanism for said clutching means; and a device actuated by fluid from the clutching means for operating the controlling mechanism.

27. The combination of driving and driven members; hydraulic clutching means for connecting said members; means for positively connecting said members; controlling mechanism for said clutching means; and a device actuated by fluid from the clutching means for operating the controlling mechanism.

28. The combination of driving and driven members; hydraulic clutching means for connecting said members; a valve for controlling the action of said clutching means; and a device actuated by fluid from the clutching means for operating said valve.

29. The combination of driving and driven members; hydraulic clutching means for connecting said members; controlling mechanism for said clutching means; a cylinder connected to receive fluid from the clutching means; a plunger for said cylinder; and mechanism operated by the relative movement of the plunger and cylinder for actuating the controlling means.

30. The combination of a driving member operating at a constant speed; a driven member; hydraulic clutching means for connecting said members; automatic mechanism for gradually causing said clutching means to couple said members, including means for governing the fluid flow in said clutching means; and a device actuated by fluid from the clutching means for operating said governing means.

31. The combination of a driving member operating at a constant speed; a driven member; hydraulic clutching means for connecting said members; automatic mechanism for gradually causing said clutching means to couple said members, including means for governing the fluid flow in said clutching means; and a device actuated by fluid from the clutching means for operating said governing means; with a weighted member for maintaining the governing means in a definite condition while the driving and driven members are coupled.

32. A fluid transmitting device consisting of a driving and a driven member; a hydraulic clutching device for connecting said members and including a structure having a relatively restricted fluid passage; with means actuated by fluid from said clutching device for varying the cross section of said passage to cause gradual operation of the clutching device and coupling of the driving and driven members.

33. A fluid transmitting device consisting of a driving and a driven member; a hydraulic clutching device for connecting said members including fluid propelling means and a relatively restricted fluid passage; a valve for varying the flow through said passage; and mechanism actuated by fluid from the clutching device for operating said valve.

In witness whereof I affix my signature.

THOMAS S. PATTERSON.